(12) United States Patent
An

(10) Patent No.: US 10,570,847 B2
(45) Date of Patent: Feb. 25, 2020

(54) METHOD AND APPARATUS FOR DIAGNOSING FAULT IN CONTINUOUS VARIABLE VALVE DURATION SYSTEM

(71) Applicant: HYUNDAI AUTRON CO., LTD., Seoul (KR)

(72) Inventor: Soung-Woong An, Yongin-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 0 days.

(21) Appl. No.: 16/197,540

(22) Filed: Nov. 21, 2018

(65) Prior Publication Data

US 2019/0178192 A1    Jun. 13, 2019

(30) Foreign Application Priority Data

Dec. 13, 2017    (KR) .......................... 10-2017-0171084

(51) Int. Cl.

| | |
|---|---|
| *F01L 1/34* | (2006.01) |
| *F02D 41/22* | (2006.01) |
| *F02D 41/00* | (2006.01) |
| *F02D 13/02* | (2006.01) |
| *F01L 13/00* | (2006.01) |

(52) U.S. Cl.
CPC ................ *F02D 41/22* (2013.01); *F01L 1/34* (2013.01); *F01L 13/0015* (2013.01); *F02D 13/0234* (2013.01); *F02D 41/0002* (2013.01); *F01L 2013/103* (2013.01); *F02D 2041/001* (2013.01)

(58) Field of Classification Search
CPC ... F01L 1/34; F01L 2013/103; F02D 41/0002; F02D 41/22; F02D 41/123; F02D 41/221; F02D 41/222; F02D 13/0234; F02D 13/0015; F02D 2200/0406; F02D 2200/101; F02D 2041/001
See application file for complete search history.

(56) References Cited

U.S. PATENT DOCUMENTS

2011/0153181 A1* 6/2011 Bagnasco ............... F01L 13/00
701/109

FOREIGN PATENT DOCUMENTS

| JP | 2004-036406 A | 2/2004 |
|---|---|---|
| JP | 2004036406 A | 2/2004 |
| JP | 2015-135064 A | 7/2015 |

(Continued)

*Primary Examiner* — Zelalem Eshete
(74) *Attorney, Agent, or Firm* — Baker & Hostetler LLP; Hyunho Park

(57) ABSTRACT

Disclosed are a method and apparatus for diagnosing a fault in a CVVD system. The method includes collecting information necessary to determine whether a fault diagnosis mode entry condition of the CVVD system is satisfied, determining whether the fault diagnosis mode entry condition is satisfied based on the collected information, calculating prediction duration corresponding to a current engine RPM and manifold pressure when the fault diagnosis mode entry condition is satisfied, calculating current duration based on an output value of a motor sensor for detecting the RPM of the duration control motor of the CVVD system, comparing the manifold pressure-based prediction duration D1 with the sensor output-based duration D2, and determining an error of the motor sensor or whether the CVVD system has failed by comparing a duration difference cumulative value, that is, a cumulative value of difference values between the D1 and D2, with a previously stored threshold.

13 Claims, 3 Drawing Sheets

(56) References Cited

FOREIGN PATENT DOCUMENTS

| | | |
|---|---|---|
| JP | 2015135064 A | 7/2015 |
| KR | 1020100011759 A | 2/2010 |
| KR | 1020060041757 A | 7/2012 |
| KR | 10-2014-0169045 A | 6/2016 |
| KR | 10-1684558 B1 | 12/2016 |
| KR | 10-2016-0031680 A | 9/2017 |

* cited by examiner

METHOD AND APPARATUS FOR DIAGNOSING FAULT IN CONTINUOUS VARIABLE VALVE DURATION SYSTEM

CROSS REFERENCE TO RELATED APPLICATION

The present application claims the benefit of Korean Patent Application No. 10-2017-0171084 filed in the Korean Intellectual Property Office on Dec. 13, 2017, the entire contents of which are incorporated herein by reference.

BACKGROUND OF THE INVENTION

1. Technical Field

The present invention relates to a method and apparatus for diagnosing a fault in a continuous variable valve duration (CVVD) system and, more particularly, to a method and apparatus for diagnosing a fault in a CVVD system, which clearly diagnose a controller failure or system failure in the CVVD system using information of the existing sensor even without using an additional part.

2. Description of the Related Art

There is a tendency toward the reinforcement of the regulation of waste gas and regulations related to fuel efficiency. Accordingly, an improvement task for a related system to improve the fuel efficiency and waste gas purification ability of the existing internal combustion engine is actively in progress. From among them, a valve train technology functioning as new air intake into a combustion chamber and waste gas discharge is actively improved.

As part of the improvement, the existing valve timing control changes into middle phase valve timing control and a center bolt oil control valve (OCV) type. There is a system capable of continuously changing a valve lift in addition to valve timing control. In addition, a CVVD system capable of handling reinforced fuel efficiency and waste gas regulations by continuously varying the opening and closing timing of the valve is also known.

Continuous variable valve duration (CVVD) is to apply a VVD technology for controlling time duration in which an engine air-intake valve is open according to circumstances. CVVD is slightly different from variable valve timing (VVT), that is, a technology for changing the opening and closing timing of the valve in response to vehicle speed. The CVVD and the VVT are the same in that they attempt to improve engine performance and fuel efficiency by maximizing a gasoline combustion rate.

The CVVD system includes a CVVD controller, including a hardware part for varying valve duration and a software element for controlling the hardware part. The CVVD controller determines a control value (or control current) in corporation with the engine controller of a vehicle, and controls a shaft for variable duration by controlling a motor forming hardware based on the determined control value (or control current).

In a common CVVD system, it is difficult to mount an actual measurement sensor for detecting an actual position upon variable duration due to a complicated structural characteristic. Accordingly, most of the existing CVVD systems configure a system to perform duration variable control using a method of indirectly predicting duration not an actual measurement method using a duration-dedicated sensor.

If duration is predicted using the indirect method, however, a method for supplementing a concern of an unsatisfactory diagnosis law when a system fails may be performed.

Specifically, control is performed by measuring and using a duration position value averaged through a motor sensor within the CVVD controller or an actual measurement value of another duration location by mounting a cam sensor and a separate target wheel within the system. Both information of the motor sensor and information of the cam sensor are used for system failure diagnosis. That is, in order to diagnose a fault in a conventional CVVD system, there are problems in that the cam sensor and the separate target wheel are necessary in addition to the motor sensor and thus a manufacturing cost and system complexity rise.

PRIOR ART DOCUMENT

[Patent Document]
(Patent Document) Korean Patent No. 10-1684558 (Dec. 2, 2016)

SUMMARY OF THE INVENTION

An object of the present invention is to provide an apparatus and method for diagnosing a fault in a CVVD system, which can clearly diagnose a controller failure or system failure in the CVVD system using information of the existing sensor even without using an additional part.

In accordance with an aspect of the present invention, a method of diagnosing a fault in a continuous variable valve duration (CVVD) system includes an information collection step of collecting information necessary to determine whether a fault diagnosis mode entry condition of the CVVD system is satisfied, a determination step of determining whether the fault diagnosis mode entry condition is satisfied based on the information collected in the information collection step, a manifold pressure-based prediction duration calculation step of calculating prediction duration corresponding to a current engine RPM and manifold pressure when the fault diagnosis mode entry condition is satisfied, a sensor output-based duration calculation step of calculating current duration based on an output value of a motor sensor for detecting an RPM of a duration control motor of the CVVD system, a duration comparison step of comparing the manifold pressure-based prediction duration D1 with the sensor output-based duration D2, and a determination step of determining an error of the motor sensor or whether the CVVD system has failed by comparing a duration difference cumulative value, that is, a cumulative value of difference values between the D1 and the D2, with a threshold previously stored in a recording device.

The information necessary to determine whether the fault diagnosis mode entry condition is satisfied, which is collected in the information collection step, includes information about whether an MAP sensor positioned in an air-intake line and a crank sensor positioned in the air-intake line to detect the engine RPM are normal and fuel cut information.

In the determination step, the fault diagnosis mode entry condition may be determined to have been satisfied when the MAP sensor and the crank sensor are a normal state and fuel cut operates.

Furthermore, in the manifold pressure-based prediction duration calculation step, the prediction duration corresponding to the current engine RPM and manifold pressure may be calculated using a duration map in which a manifold pressure change according to a valve duration change has been stored.

Furthermore, in the sensor output-based duration calculation step, the current duration may be calculated based on a duration position value according to the accumulation of the RPM of the motor capable of being aware based on the output of the motor sensor.

Furthermore, the determination step may include a first determination step of diagnosing an error of the motor sensor by comparing the duration difference cumulative value (cumulative Diff) with a first threshold previously stored in the recording device and a second determination step of diagnosing a fault in the CVVD system by comparing the duration difference cumulative value (cumulative Diff) with a second threshold which is a different threshold previously stored in the recording device when the duration difference cumulative value (cumulative Diff) exceeds the first threshold.

In this case, if, as a result of the determination of the comparison in the determination step, the duration difference cumulative value (cumulative Diff) is greater than the first threshold and equal to or smaller than the second threshold, an error of the motor sensor may be determined and control to switch to a limp-home mode, that is, an emergency driving mode, may be performed.

In contrast, if, as a result of the determination of the comparison in the determination step, the duration difference cumulative value (cumulative Diff is greater than the first threshold and greater than the second threshold, a system failure may be determined and failure information may be displayed through a sound signal or visual display means in such a way as to be recognizable by a driver.

In accordance with another aspect of the present invention, an apparatus for diagnosing a fault in a continuous variable valve duration (CVVD) system includes an ECU and a CVVD controller configured to determine a control value in cooperation with the ECU and control a shaft for variable duration by controlling a duration control motor based on the determined control value. The CVVD controller includes a sensor output-based duration calculation unit configured to calculate current duration based on an output value of a motor sensor for detecting an RPM of the duration control motor of the CVVD system. The ECU includes an information collection unit configured to collect information necessary to determine whether a fault diagnosis mode entry condition of the CVVD system is satisfied, a determination unit configured to determine whether the fault diagnosis mode entry condition is satisfied based on the information collected by the information collection unit, a manifold pressure-based prediction duration calculation unit configured to calculate prediction duration corresponding to a current engine RPM and manifold pressure when the fault diagnosis mode entry condition is satisfied, and a determination unit configured to compare the manifold pressure-based prediction duration D1 with the sensor output-based duration D2 and to determine an error of the motor sensor or whether the CVVD system has failed by comparing a duration difference cumulative value, which is a cumulative value of difference values between the D1 and the D2, with a threshold previously stored in a recording device.

In this case, the information necessary to determine whether the fault diagnosis mode entry condition is satisfied, which is collected in the information collection step, includes information about whether an MAP sensor positioned in an air-intake line and a crank sensor positioned in the air-intake line to detect the engine RPM are normal and fuel cut information. The determination unit may determine that the fault diagnosis mode entry condition is satisfied when the MAP sensor and the crank sensor are a normal state and fuel cut operates.

Furthermore, the manifold pressure-based prediction duration calculation unit may calculate the prediction duration corresponding to the current engine RPM and manifold pressure using a duration map in which a manifold pressure change according to a valve duration change has been stored.

Furthermore, the sensor output-based duration calculation unit may calculate the current duration based on a duration position value according to the accumulation of the RPM of the motor capable of being aware based on the output of the motor sensor.

Furthermore, the determination unit may diagnose an error of the motor sensor by comparing the duration difference cumulative value (cumulative Diff) with a first threshold previously stored in the recording device, and may diagnose a fault in the CVVD system by comparing the duration difference cumulative value (cumulative Diff) with a second threshold which is a different threshold previously stored in the recording device when the duration difference cumulative value (cumulative Diff) exceeds the first threshold.

When the duration difference cumulative value (cumulative Diff) is greater than the first threshold and equal to or smaller than the second threshold, an error of the motor sensor may be determined and a mode may switch to a limp-home mode which is an emergency driving mode. When the duration difference cumulative value (cumulative Diff is greater than the first threshold and greater than the second threshold, a system failure may be determined and failure information may be displayed through a sound signal or visual display means in such a way as to be recognizable by a driver.

DESCRIPTION OF REFERENCE NUMERALS

Figure 1:
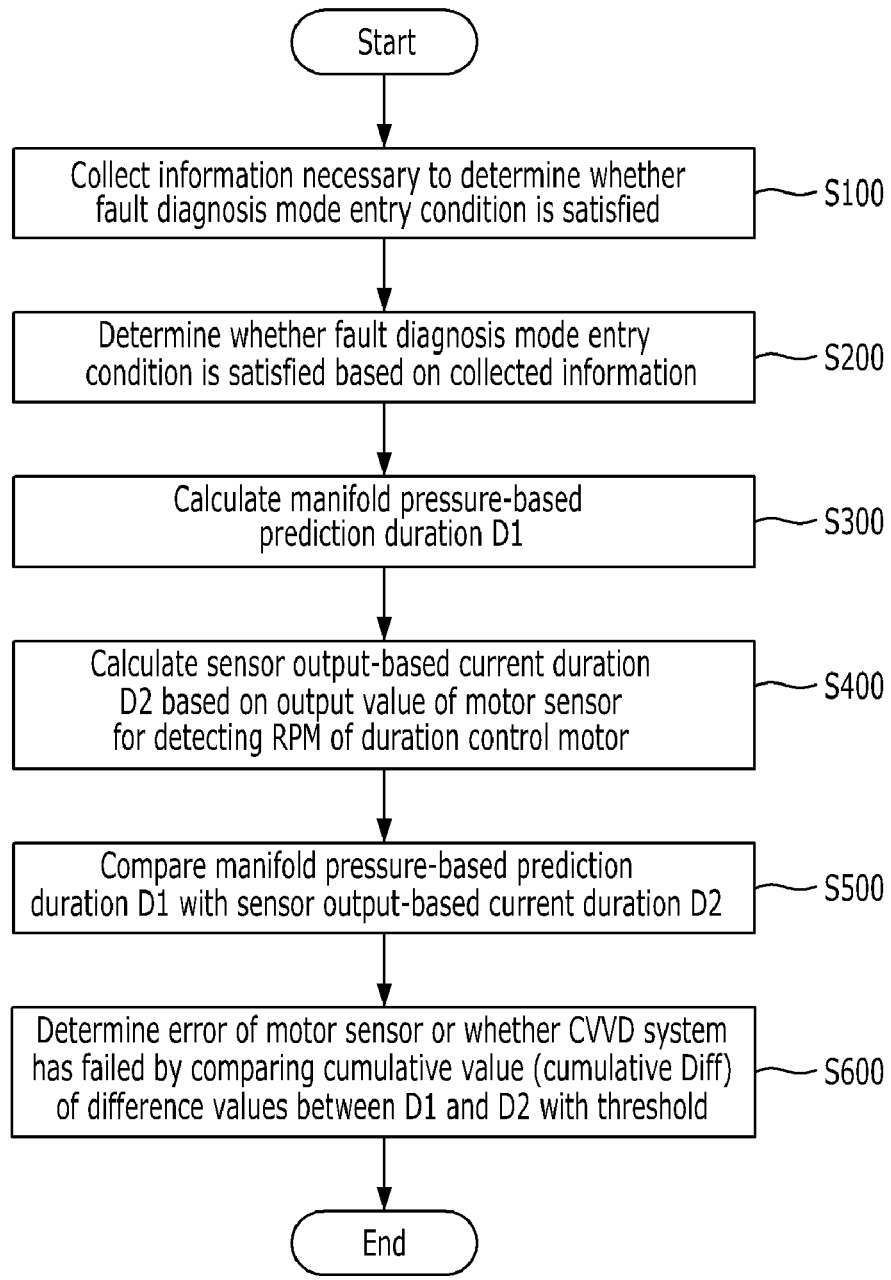
FIG. 1 is a schematic control flowchart the diagnosis of a failure in a CVVD system according to an aspect of the present invention.

10: information collection unit
20: determination unit
30: manifold pressure-based prediction duration calculation unit
40: sensor output-based duration calculation unit
50: determination unit

DETAILED DESCRIPTION

Hereinafter, embodiments of the present invention are described in detail with reference to the accompanying drawings.

In describing the present invention, terms used in this specification are merely used to describe a specific embodiment and are not intended to limit the present invention. An expression of the singular number includes a plurality of expressions unless clearly defined otherwise in the context.

It may be understood that a term, such as "include", "comprise" or "have", indicates the presence of a characteristic, number, step, operation, element, part or a combination of them described in the specification, and does not exclude the presence or addition possibility of one or more other characteristics, numbers, steps, operations, elements, parts or combinations of them in advance.

Furthermore, terms, such as the first and the second, may be used to describe various elements, but the elements should not be restricted by the terms. The terms are used to only distinguish between one element and the other element.

In addition, a term, such as " . . . unit", " . . . part" or " . . . module" described in the specification, means a unit for processing at least one function or operation, and this may be implemented by hardware or software or a combination of them.

Furthermore, in describing the present invention with reference to the accompanying drawings, the same element is assigned the same reference numeral, and a redundant description of the same element is omitted. Furthermore, in describing the present invention, a detailed description of a related known technology will be omitted if it is deemed to make the gist of the present invention unnecessarily vague.

In general, a motor sensor for motor control is mounted on a CVVD controller. The motor is mechanically directly coupled to a shaft for duration control, so rotatory power of the motor is incorporated into the duration control. Accordingly, when the cumulative value of the RPM of the motor is aware from information provided by the motor sensor, a current duration position value can be aware indirectly. That is, duration can be aware based on the cumulative value of the RPM of the motor.

In view of the characteristic of a CVVD system capable of continuous control on timing when the air-intake valve of an engine is open or closed, valve duration control has a directly influence on the amount of intake air. Accordingly, whether valve duration is normally controlled may be determined based on information of manifold pressure on which the amount of air filled into a cylinder can be indirectly measured.

In other words, if a driving condition is restricted for diagnosis purposes, a change of manifold pressure has a very similar behavior characteristic in response to a change of duration. As a result, the amount of a valve duration change may be predicted based on information detected by corresponding sensors (e.g., a crank sensor and an MAP sensor), that is, information about an engine RPM and a change of manifold pressure.

Accordingly, in the state in which a specific condition for diagnosis purposes is satisfied, whether a sensor within the CVVD controller is appropriate or a system failure may be diagnosed by comparing duration according to the CVVD controller, which may be indirectly calculated based on a cumulative value of the output values of the motor sensor, with manifold pressure-based model duration based on the signal of the MAP sensor.

The present invention has been invented to rapidly diagnose an error of a sensor (e.g., motor sensor) within a CVVD system or a fault in the CVVD system using the existing information without a separate element by comparing duration that may be indirectly calculated based on a cumulative value of the motor sensor with manifold pressure-based model duration as described above. Embodiments of the present invention are described in detail with reference to the accompanying drawings.

Figure 2:
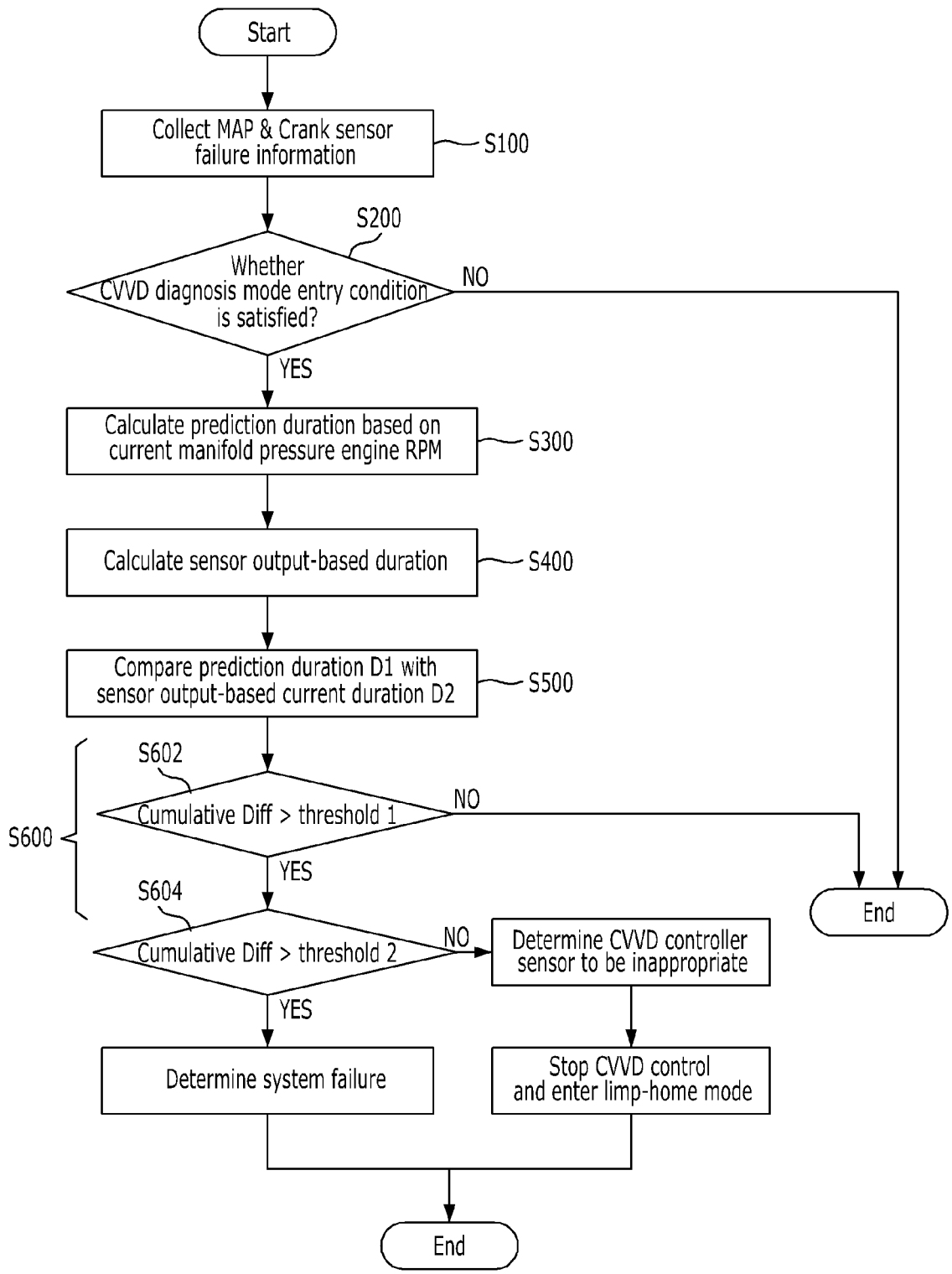
FIG. 2 is a flowchart including a detailed control algorithm for the diagnosis a fault in a CVVD system.

FIG. 1 is a schematic control flowchart the diagnosis of a failure in a CVVD system according to an aspect of the present invention. FIG. 2 is a flowchart including a detailed control algorithm for the diagnosis a fault in a CVVD system.

Referring to FIGS. 1 and 2, the method of diagnosing a failure in a CVVD system according to an aspect of the present invention includes an information collection step S100, a determination step S200, a manifold pressure-based prediction duration calculation step S300, a sensor output-based duration calculation step S400, a duration comparison step S500 of comparing two duration values, and a last determination step S600.

In the information collection step S100, information necessary to determine whether the fault diagnosis mode entry condition of the CVVD system is satisfied is collected from an ECU or various sensors within a vehicle. The information necessary to determine whether the fault diagnosis mode entry condition is satisfied, collected in the information collection step S100, may include information about whether an MAP sensor and crank sensor disposed in an air-intake line are normal and fuel cut information.

In the determination step S200, whether the fault diagnosis mode entry condition is satisfied is determined based on the information (i.e., the information about whether the MAP sensor and crank sensor disposed in the air-intake line are normal and the fuel cut information) collected in the information collection step S100. Specifically, in the determination step S200, if the MAP sensor and the crank sensor are a normal state and fuel cut according to coasting operates, the fault diagnosis mode entry condition may be determined to have been satisfied.

If, as a result of the determination in the determination step S200, it is determined that the current state of the vehicle satisfies the fault diagnosis mode entry condition, prediction duration corresponding to a current engine RPM and manifold pressure is calculated in the manifold pressure-based prediction duration calculation step S300. If it is determined that the fault diagnosis mode entry condition is not satisfied, the process is terminated in this state.

In the manifold pressure-based prediction duration calculation step S300, prediction duration corresponding to a current engine RPM and manifold pressure may be determined using a duration map stored in a recording device. In this case, the duration map is the results of valve duration databased in a matrix form with respect to the two factors of the manifold pressure and the engine RPM, and may be a set of the results derived through simulations or repeated experiments.

In addition to the method using the map, all of methods that may be practically derived, including a method of applying an algorithm for automatically calculating and outputting the best duration when manifold pressure and an engine RPM are received by applying an algorithm for deriving a given relation equation between an engine RPM and manifold pressure according to a duration change through repeated experiments or simulations and including the derived relation equation, may be taken into consideration.

In the sensor output-based duration calculation step S400, current duration is calculated based on an output value of the motor sensor for detecting the RPM of the duration control motor of the CVVD system. The reason for this is that a current duration position value when valve duration is controlled can be reversely aware if a cumulative value of the RPM of the duration control motor is aware based on the information provided by the motor sensor as described above.

Accordingly, if the results of previous experiments or simulations, for example, data related to a change of a duration position value according to the accumulation of the RPM of the motor is used, current duration corresponding to the cumulative value of the RPM of the duration control motor provided by the motor sensor can be calculated or determined without difficulty. In addition to the method using the map, various methods may be taken into consideration and the present invention is not limited to the use of map data.

In the duration comparison step S500, a process of comparing the two duration values D1 and D2 is executed. That is, in the duration comparison step S500, a process of comparing the manifold pressure-based prediction duration D1 and the sensor output-based duration D2 calculated or determined in the manifold pressure-based prediction duration calculation step S300 and the sensor output-based duration calculation step S400 is executed.

Finally, in the determination step S600, an error of the motor sensor or whether the CVVD system has failed is determined based on a result of the comparison in the duration comparison step S500. A cumulative value of a difference value between the duration values D1 and D2, that is, a duration difference cumulative value (cumulative Diff) is previously stored in a recording device, such as memory. An error of the motor sensor or whether the CVVD system has failed is determined by comparing the duration difference cumulative value with a threshold, that is, a criterion for a comparison.

Specifically, the determination step S600 may include a first determination step S602 of diagnosing an error of the motor sensor by comparing the cumulative value (cumulative Diff) with a first threshold previously stored in the recording device and a second determination step S604 of diagnosing a fault in the CVVD system by comparing the cumulative value (cumulative Diff) with a second threshold, that is, a different threshold previously stored in the recording device, if the cumulative value exceeds the first threshold.

In this case, the two thresholds (i.e., first threshold and second threshold), that is, criteria for determining an error or a failure, may be the results derived through previous simulations or repeated simulation experiments. A difference value between the duration values D1 and D2 is accumulated. An average value of the cumulative values when a sensor error symptom or a system failure occurs may be derived and used as a threshold.

A method of accumulating the RPM of the CVVD controller based on the accumulation of the RPM of the motor may lead to an unwanted calculation error due to a CVVD system mileage characteristic or a sensor error. A control error corresponding to the unwanted calculation error is slowly accumulated. Accordingly, an accurate determination may be made only when the first threshold for determining a sensor error is set smaller than the second threshold for determining a system failure.

The method according to an embodiment of the present invention may further include a countermeasure process of taking proper countermeasures based on a result in the determination step S600. The countermeasure process may include a process of determining an error of the motor sensor when the cumulative value (cumulative Diff) is greater than the first threshold and equal to or smaller than the second threshold and switching to a limp-home mode, that is, an emergency driving mode.

Furthermore, the countermeasure process may include a process of determining a system failure when the cumulative value (cumulative Diff) is greater than the first threshold and greater than the second threshold as a result of the comparison in the determination step, generating a related execution signal so that failure information is displayed through a sound signal or visual display means so that it can be recognized by a driver, and providing the execution signal to corresponding display means.

Hereinafter, an apparatus for diagnosing a failure in a CVVD system for a fault diagnosis process implementation of the CVVD system is described.

Figure 3:
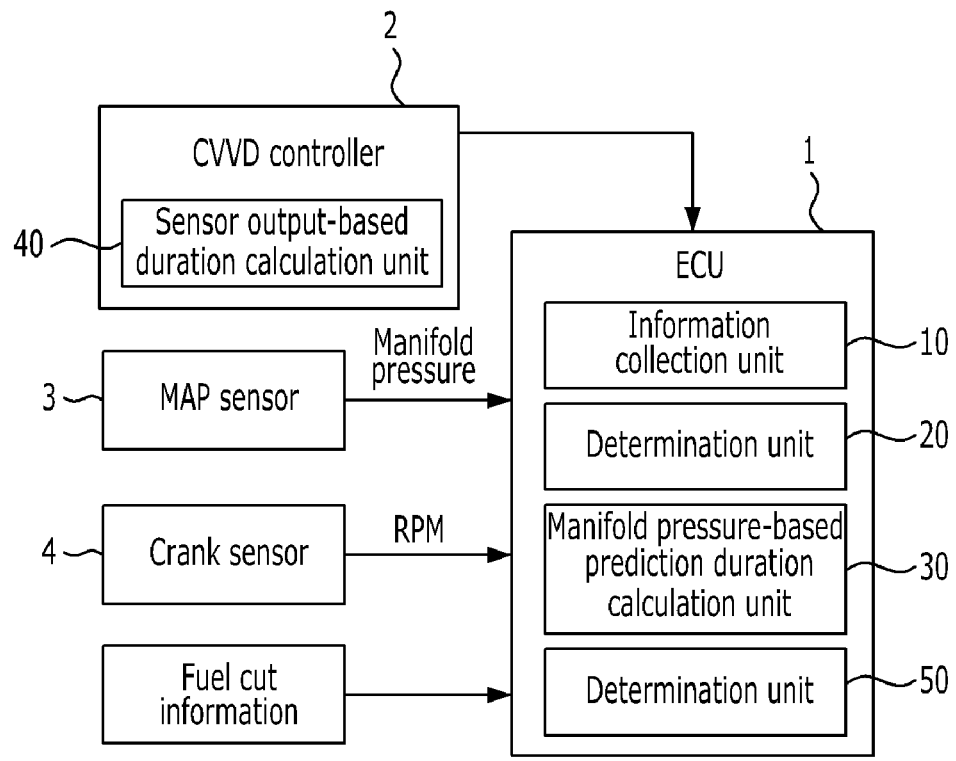
FIG. 3 is a schematic configuration of an apparatus for diagnosing a failure in a CVVD system according to another aspect of the present invention.

FIG. 3 is a schematic configuration of an apparatus for diagnosing a failure in a CVVD system according to another aspect of the present invention.

Referring to FIG. 3, the apparatus for diagnosing a failure in a CVVD system according to another aspect of the present invention includes an ECU 1 and a CVVD controller 2 configured to determine a control value in cooperation with the ECU 1 and to control a shaft for variable duration by controlling a duration control motor based on the determined control value. The CVVD apparatus controlled by the CVVD controller is an already known configuration, and a detailed description of mechanical elements thereof is omitted.

The ECU 1 includes an information collection unit 10 configured to collect information necessary to determine whether the fault diagnosis mode entry condition of the CVVD system is satisfied. In this case, the information necessary to determine whether the fault diagnosis mode entry condition is satisfied may include information about whether an MAP sensor 3 and a crank sensor 4 disposed in an air-intake line are normal and fuel cut information.

The information collected by the information collection unit 10 is provided to a determination unit 20. The determination unit 20 determines whether the fault diagnosis mode entry condition is satisfied based on the information provided by the information collection unit 10. Specifically, the determination unit 20 may determine that the fault diagnosis mode entry condition has been satisfied when the MAP sensor 3 and the crank sensor 4 are a normal state and fuel cut according to coasting operates.

If, as a result of the determination of the determination unit 20, the current state of a vehicle satisfies the fault diagnosis mode entry condition, a manifold pressure-based prediction duration calculation unit 30 calculates prediction duration corresponding to a current engine RPM and manifold pressure. If it is determined that the fault diagnosis mode entry condition has not been satisfied, the process is terminated in this state.

The manifold pressure-based prediction duration calculation unit 30 may determine the prediction duration corresponding to the current engine RPM and the manifold pressure using a duration map stored in the recording device. In this case, the duration map is the results of valve duration databased in a matrix form with respect to the two factors of the manifold pressure and the engine RPM, and may be a set of the results derived through simulations or repeated experiments.

In addition to the method using the map, all of methods that may be practically derived, including a method of applying an algorithm for automatically calculating and outputting the best duration when manifold pressure and an engine RPM are received by applying an algorithm for deriving a given relation equation between an engine RPM and manifold pressure according to a duration change through repeated experiments or simulations and including the derived relation equation, may be taken into consideration.

The apparatus for diagnosing a fault according to an embodiment of the present invention further includes a sensor output-based duration calculation unit 40. The sensor output-based duration calculation unit 40 calculates current duration from an output value of the motor sensor for detecting the RPM of the duration control motor of the CVVD system. The reason for this is that a current duration position value when valve duration is controlled can be reversely aware if a cumulative value of the RPM of the duration control motor is aware based on the information provided by the motor sensor.

Accordingly, if the results of previous experiments or simulations, for example, data related to a change of a duration position value according to the accumulation of the RPM of the motor is used, current duration corresponding to the cumulative value of the RPM of the duration control motor provided by the motor sensor can be calculated or determined without difficulty. In addition to the method using the map, various methods may be taken into consideration and the present invention is not limited to the use of map data.

The information of the manifold pressure-based prediction duration D1 and the sensor output-based duration D2 is provided to the determination unit 50. The determination unit compares the manifold pressure-based prediction duration D1 with the sensor output-based duration D2, and determines an error of the motor sensor or whether the CVVD system has failed by comparing a cumulative value of difference values between the D1 and D2, that is, a duration difference cumulative value, with a threshold previously stored in a recording device.

The determination unit 50 may determine an error of the motor sensor by comparing the duration difference cumulative value (cumulative Diff) with a first threshold previously stored in the recording device, or may determine a fault in the CVVD system by comparing the cumulative value (cumulative Diff) with a second threshold, that is, a different threshold previously stored in the recording device, when the cumulative value (cumulative Diff) exceeds the first threshold.

In this case, the two thresholds (i.e., first threshold and second threshold), that is, criteria for determining an error or a failure, may be the results derived through previous simulations or repeated simulation experiments. A difference value between the duration values D1 and D2 is accumulated. An average value of the cumulative values when a sensor error symptom or a system failure occurs may be derived and used as a threshold.

Specifically, when the cumulative value (cumulative Diff) is greater than the first threshold and equal to or smaller than the second threshold, the determination unit 50 may determine a fault in the motor sensor and change a mode to a limp-home mode, that is, an emergency driving mode. When the cumulative value is greater than the first threshold and is also greater than the second threshold, the determination unit 50 may determine a system failure, may generate a related execution signal so that corresponding failure information is displayed through a sound signal or visual display means so that it can be recognized by a driver, and may provide the execution signal to corresponding display means.

In accordance with the apparatus and method for diagnosing a failure in a CVVD system according to an embodiment of the present invention, information of the existing sensors disposed in a vehicle is used to diagnose a controller failure or system failure in a CVVD system. Specifically, a model duration value based on manifold pressure is used instead of the existing assistant cam sensor and target wheel. Sensor matching and a system failure are determined by comparing a model duration value with a CVVD controller duration value.

Accordingly, a CVVD system having a function capable of clearly diagnosing a controller failure or system failure of the CVVD system even without using an additional part can be constructed. Furthermore, the use of separate parts, such as an assistant cam sensor and a target wheel necessary for diagnosis, can be excluded. Accordingly, an overall manufacturing cost can be reduced and market competitiveness can be secured.

In accordance with the apparatus and method for diagnosing a failure in a CVVD system according to an embodiment of the present invention, information of the existing sensors disposed in a vehicle is used to diagnose a controller failure or system failure of a CVVD system. Specifically, a model duration value based on manifold pressure instead of the existing assistant cam sensor and target wheel is used for diagnosis. Sensor matching and a system failure are determined by comparing a model duration value with a CVVD controller duration value.

Accordingly, a CVVD system having a function capable of clearly diagnosing a controller failure or system failure of the CVVD system even without using an additional part can be constructed. Furthermore, the use of separate parts, such as an assistant cam sensor and a target wheel necessary for diagnosis, can be excluded. Accordingly, an overall manufacturing cost can be reduced, the complexity of a system can be reduced, and market competitiveness can be secured.

In the detailed description of the present invention, only some special embodiments of the present invention have been described. It is however to be understood that the present invention is not limited to the special embodiments described in the detailed description, but should be construed as including all of changes, equivalents and substitutes without departing from the spirit and range of the present invention defined by the appended claims.

What is claimed is:

1. A method of diagnosing a fault in a continuous variable valve duration (CVVD) system, the method comprising:

an information collection step of collecting information necessary to determine whether a fault diagnosis mode entry condition of the CVVD system is satisfied;

a determination step of determining whether the fault diagnosis mode entry condition is satisfied based on the information collected in the information collection step;

a manifold pressure-based prediction duration calculation step of calculating prediction duration corresponding to a current engine RPM and manifold pressure when the fault diagnosis mode entry condition is satisfied;

a sensor output-based duration calculation step of calculating current duration based on an output value of a motor sensor for detecting an RPM of a duration control motor of the CVVD system;

a duration comparison step of comparing the manifold pressure-based prediction duration D1 with the sensor output-based duration D2; and a determination step of determining an error of the motor sensor or whether the CVVD system has failed by comparing a duration difference cumulative value, which is a cumulative value of difference values between the D1 and the D2, with a threshold previously stored in a recording device.

2. The method of claim 1, wherein:
the information necessary to determine whether the fault diagnosis mode entry condition is satisfied, which is collected in the information collection step, comprises information about whether an MAP sensor positioned in an air-intake line and a crank sensor positioned in the air-intake line to detect the engine RPM are normal and fuel cut information, and in the determination step, the fault diagnosis mode entry condition is determined to have been satisfied when the MAP sensor and the crank sensor are a normal state and fuel cut operates.

3. The method of claim 1, wherein in the manifold pressure-based prediction duration calculation step, the prediction duration corresponding to the current engine RPM and manifold pressure is calculated using a duration map in which a manifold pressure change according to a valve duration change has been stored.

4. The method of claim 1, wherein in the sensor output-based duration calculation step, the current duration is calculated based on a duration position value according to an accumulation of the RPM of the motor capable of being aware based on the output of the motor sensor.

5. The method of claim 1, wherein the determination step comprises:
a first determination step of diagnosing an error of the motor sensor by comparing the duration difference cumulative value (cumulative Diff) with a first threshold previously stored in the recording device; and
a second determination step of diagnosing a fault in the CVVD system by comparing the duration difference cumulative value (cumulative Diff) with a second threshold which is a different threshold previously stored in the recording device when the duration difference cumulative value (cumulative Diff) exceeds the first threshold.

6. The method of claim 5, wherein if, as a result of the determination of the comparison in the determination step, the duration difference cumulative value (cumulative Diff) is greater than the first threshold and equal to or smaller than the second threshold, an error of the motor sensor is determined and a mode switches to a limp-home mode which is an emergency driving mode.

7. The method of claim 5, wherein if, as a result of the determination of the comparison in the determination step, the duration difference cumulative value (cumulative Diff is greater than the first threshold and greater than the second threshold, a system failure is determined and failure information is displayed through a sound signal or visual display means in such a way as to be recognizable by a driver.

8. An apparatus for diagnosing a fault in a continuous variable valve duration (CVVD) system, the apparatus comprising:
an ECU; and
a CVVD controller configured to determine a control value in cooperation with the ECU and control a shaft for variable duration by controlling a duration control motor based on the determined control value,
wherein the CVVD controller comprises a sensor output-based duration calculation unit configured to calculate current duration based on an output value of a motor sensor for detecting an RPM of the duration control motor of the CVVD system, wherein the ECU comprises:
an information collection unit configured to collect information necessary to determine whether a fault diagnosis mode entry condition of the CVVD system is satisfied,
a determination unit configured to determine whether the fault diagnosis mode entry condition is satisfied based on the information collected by the information collection unit,
a manifold pressure-based prediction duration calculation unit configured to calculate prediction duration corresponding to a current engine RPM and manifold pressure when the fault diagnosis mode entry condition is satisfied; and
a determination unit configured to compare the manifold pressure-based prediction duration D1 with the sensor output-based duration D2 and to determine an error of the motor sensor or whether the CVVD system has failed by comparing a duration difference cumulative value, which is a cumulative value of difference values between the D1 and the D2, with a threshold previously stored in a recording device.

9. The apparatus of claim 8, wherein:
the information necessary to determine whether the fault diagnosis mode entry condition is satisfied, which is collected in the information collection step, comprises information about whether an MAP sensor positioned in an air-intake line and a crank sensor positioned in the air-intake line to detect the engine RPM are normal and fuel cut information, and
the determination unit determines that the fault diagnosis mode entry condition is satisfied when the MAP sensor and the crank sensor are a normal state and fuel cut operates.

10. The apparatus of claim 8, wherein the manifold pressure-based prediction duration calculation unit calculates the prediction duration corresponding to the current engine RPM and manifold pressure using a duration map in which a manifold pressure change according to a valve duration change has been stored.

11. The apparatus of claim 8, wherein the sensor output-based duration calculation unit calculates the current duration based on a duration position value according to an accumulation of the RPM of the motor capable of being aware based on the output of the motor sensor.

12. The apparatus of claim 8, wherein the determination unit diagnoses an error of the motor sensor by comparing the duration difference cumulative value (cumulative Diff) with a first threshold previously stored in the recording device and diagnoses a fault in the CVVD system by comparing the duration difference cumulative value (cumulative Diff) with a second threshold which is a different threshold previously stored in the recording device when the duration difference cumulative value (cumulative Diff) exceeds the first threshold.

13. The apparatus of claim 12, wherein:
when the duration difference cumulative value (cumulative Diff) is greater than the first threshold and equal to or smaller than the second threshold, an error of the motor sensor is determined and a mode switches to a limp-home mode which is an emergency driving mode, and
when the duration difference cumulative value (cumulative Diff is greater than the first threshold and greater than the second threshold, a system failure is determined and failure information is displayed through a sound signal or visual display means in such a way as to be recognizable by a driver.

\* \* \* \* \*